June 19, 1951

F. H. SWAIM 2,557,157

MOTOR OPERATED TOWING BRACKET
FOR HYDRODYNAMIC TESTING

Filed May 10, 1946

INVENTOR.
Frank H. Swaim
BY
M. O. Hayes
ATTORNEY.

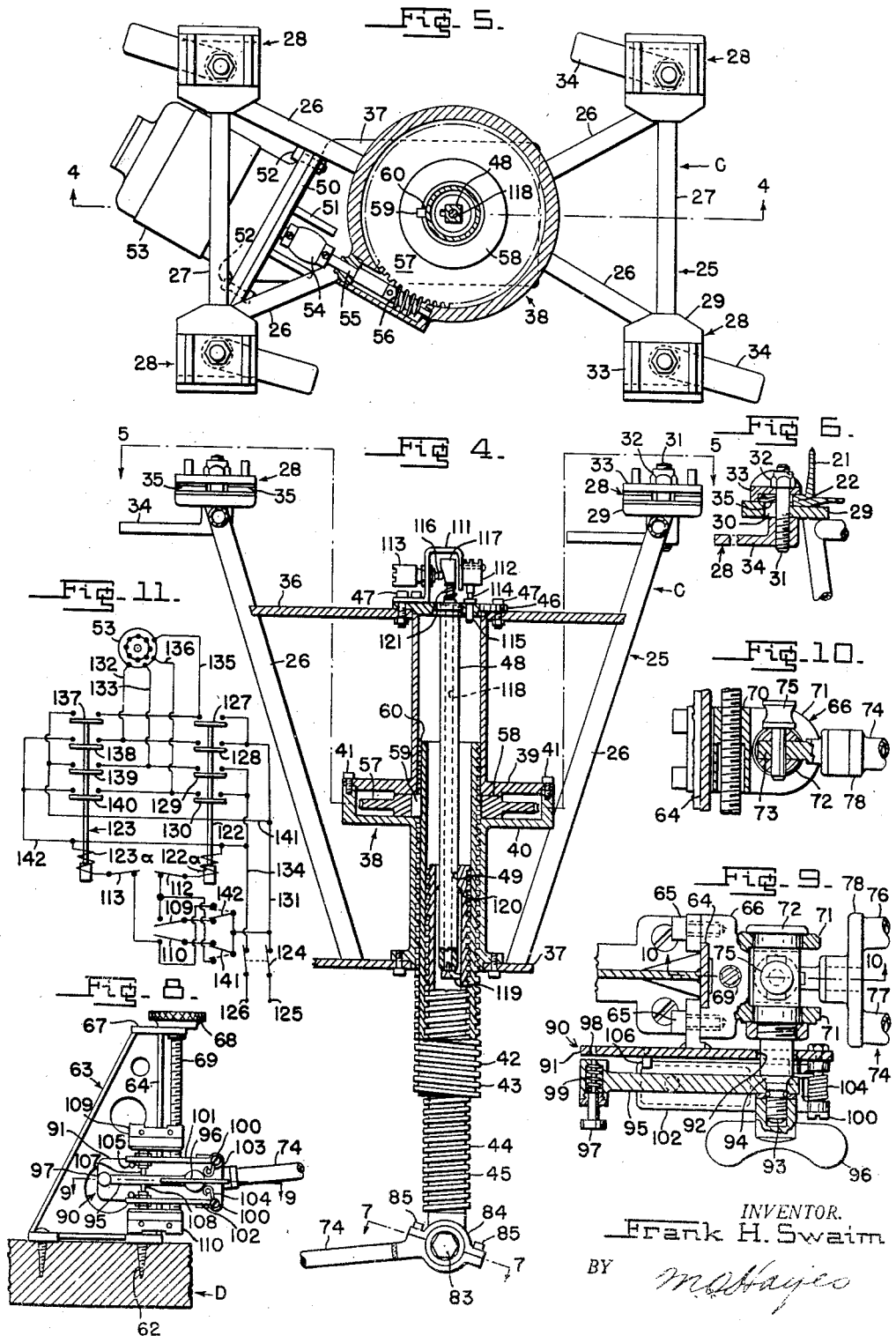

Patented June 19, 1951

2,557,157

UNITED STATES PATENT OFFICE 2,557,157

MOTOR OPERATED TOWING BRACKET FOR HYDRODYNAMIC TESTING

Frank H. Swaim, Silver Spring, Md.

Application May 10, 1946, Serial No. 668,991

11 Claims. (Cl. 115—6)

(Granted under the act of March 3, 1883, as amended April 30, 1928; 370 O. G. 757)

The invention relates to improvements in towing brackets particularly adapted for use in hydrodynamic testing of ship models.

In order to predict the performance and improve the design of ships, boats and special nautical devices, according to one method, scale models of the bodies to be tested have been towed through still water in elongate testing basins while dynamometers have measured the hydrodynamic forces exerted on the models. Tests have also been conducted in circulating water channels wherein the models have been held stationary and the hydrodynamic forces exerted on the objects under test have been measured by methods similar to those utilized in conventional still-water basins. In order to facilitate such tests, special towing brackets have been designed and manufactured for use in surface and underwater towing operations. One of these brackets had been used for the towing of high speed motor boat models but because of the tendency of their bows to rise from the water at operating speeds, great difficulty was encountered in adjusting the height of the towpoint hinge at the lower end of the bracket so that it would lie in the line of the propeller shaft axis of the model when the model was running at any selected speed. This adjustment had to be made during the early part of the measuring run without touching the towing bracket or the floating beam of the dynamometer.

An important object of the present invention is to provide a towing bracket having means automatically adjusting the height of the towpoint hinge at the lower end of the bracket so that the hinge will lie in the line of the propeller shaft axis of the model when the model is running at any desired speed.

Another object of the invention is to provide a towing bracket having automatic means tending to maintain the tow link or yoke that connects the bracket to the model in a predetermined angular towing relation to the model when the latter is running at any speed.

A further object of the invention is the provision of a towing bracket of the character described which is compact and so arranged as to reduce wind resistance of the bracket and its associated mechanism to a minimum.

A still further object is the provision of a towing bracket occupying a relatively small space below the dynamometer beam and having telescopically adjustable screws permitting wide variations in the height of the towpoint.

Other objects and advantages of the invention will become apparent during the course of the following detailed description, taken in connection with the accompanying drawings, forming a part of this specification, and in which drawings, Figure 1 is a view partly in vertical transverse section and partly in front elevation of a still-water testing basin provided with a model towing carriage equipped with the improved towing bracket.

Figure 4 is a fragmentary view of the towing bracket partly in central longitudinal section and partly in side elevation, taken substantially on the line 4—4 of Figure 5.

Figure 5 is a view of the towing bracket partly in top plan and partly in horizontal section taken substantially on the line 5—5 of Figure 4.

Figure 6 is a fragmentary vertical section detail view of a clamp preferably forming part of the bracket.

Figure 8 is a side elevational view of the towpost and switch control mechanism.

Figure 9 is a fragmentary horizontal sectional detail view of the towpost and switch control mechanism substantially on the line 9—9 of Figure 8.

Figure 10 is a fragmentary central vertical sectional view of the towpost hinge taken substantially on the line 10—10 of Figure 9.

Figure 11 is a diagrammatic view of an electrical system for automatically controlling the relative position of parts of the towing equipment.

Figure 2:
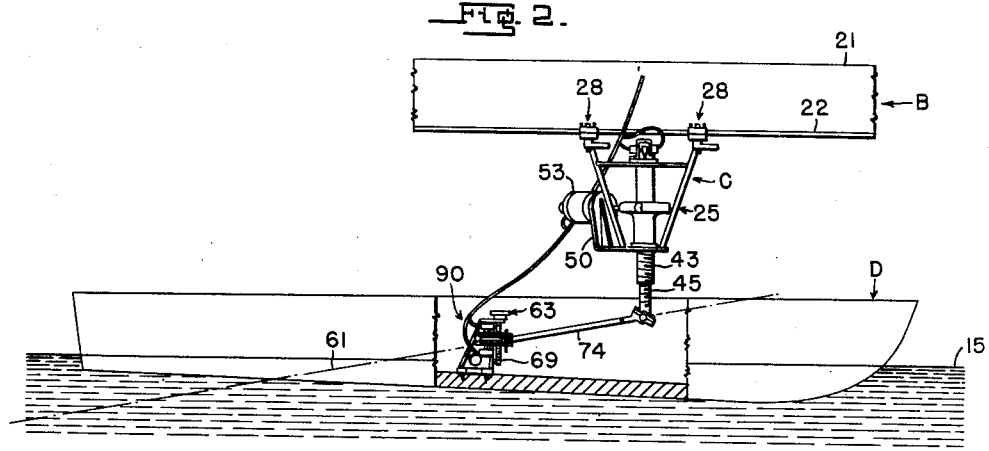
Figures 2 and 3 are fragmentary views partly in side elevation and partly in central longitudinal section illustrating the relationship of parts of the towing bracket prior to and during a test run.

In the drawings, which show only a preferred embodiment of the invention, and wherein similar reference characters denote corresponding parts throughout the several views, the letter A designates a still-water testing basin provided with a model towing carriage B equipped with the improved bracket C for towing a model D.

The testing basin A is a long, narrow, rectangular open structure containing water 15 and including longitudinal sidewalls 16, 17 which horizontally support a pair of spaced parallel rails 18, 19 forming a track. Transversely spanning the testing basin A and movable longitudinally thereof on the rails 18, 19 is the wheeled carriage B which, in the example shown, is made of welded steel tubing 20 in the form of a bridge. Supported in central longitudinal relation to the towing carriage B at its under side is a conventional floating beam 21 forming part of a dynamometer (not shown) and through which a measured towing force may be transmitted. In the example shown, the lower portion of this dynamometer beam 21 is provided on each side with a narrow horizontal flange 22.

The towing bracket C comprises a framework 25 including downwardly convergent struts 26 and transverse braces 27 extending between the upper ends of the struts. The framework 25 is releasably attachable to the underside of the dynamometer beam for adjustment therealong as by clamps 28 which engage the longitudinal flanges 22 of the dynamometer beam. Each clamp 28 includes a strut pad 29 transversely slotted at 30 for the reception of a clamp stud 31. Fixed on the clamp stud is a castle nut 32 adopted to bear against a clamp plate 33 when the stud 31 is drawn down through the slotted pad as by rotation of a handle 34 threaded on the stud. The pad 29 and plate 33 are urged apart as by leaf springs 35 so as to provide space therebetween for the flange 22 of the dynamometer beam.

Fastened between top and bottom bracket plates 36, 37 is a worm gear housing 38 having upper and lower tubular portions 39, 40 rigidly connected as by cap screws 41. The lower tubular portion 40 only is provided with internal screw threads, and these, in the example shown, are left-handed square threads for engagement with similar external square threads 42 on a tube 43. This tube 43 is provided with internal right-handed square threads for engagement with similar external square threads 44 on a hollow shaft 45. Fixed to the top plate 36 as by disc 46 and bolts 47 is a square shaft 48 having its lower end portion disposed within and slidably engaging the walls 49 of a square opening at the upper end of the hollow shaft 45. Thus the hollow shaft 45 is held against turning so that when the tube 43 is raised or lowered by rotation, the shaft 45 will travel up or down at twice the speed of the tube 43.

Rigidly secured to the bottom plate 37 rearwardly of the housing 38 is an upstanding diagonal plate 50 provided on its forward side with strengthening fins 51. Mounted on the rear side of the plate, as by bolts 52, is a four-wire reversible capacitor motor 53 having its shaft connected, as by a suitable flexible coupling 54 to a shaft 55 which extends into the housing 38. Fastened on the shaft 55 within the housing is a worm 56 meshing with a worm wheel 57 whose hub 58 encircles the tube 43 and is provided with a key 59 disposed in a groove 60 that extends longitudinally of the tube 43 and interrupts the threads thereon. This arrangement transmits rotary motion from the gear 57 to the tube 43 while permitting movement of the tube 43 longitudinally of the housing. The motor 53 is preferably equipped with conventional braking means (not shown) which, in conjunction with the locking characteristics of the worm 56 and the frictional drag between the threaded shaft 45 and tube 43, will tend to quickly stop rotation of the tube 43 upon deenergization of the motor.

Figure 3:
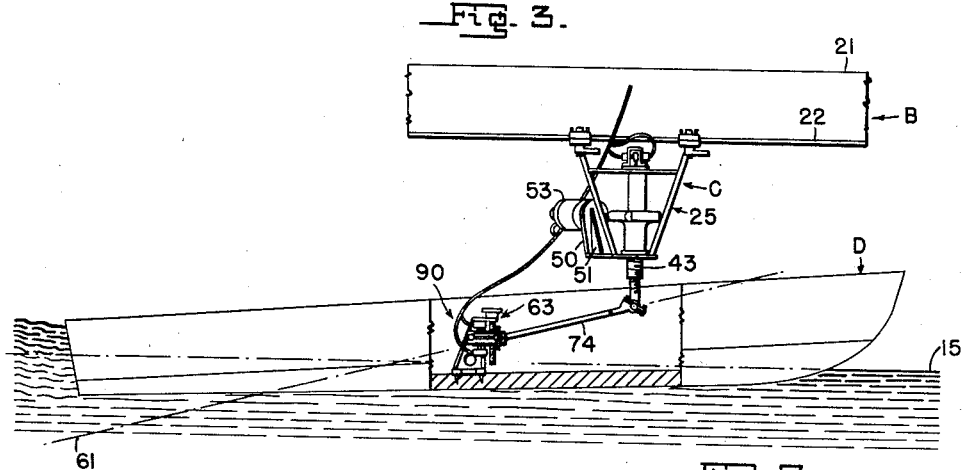
Figure 7:
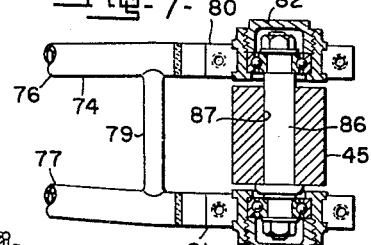
Figure 7 is a fragmentary transverse sectional detail view of the bracket at the towpoint hinge substantially on the line 7—7 of Figure 4.
Figure 1:
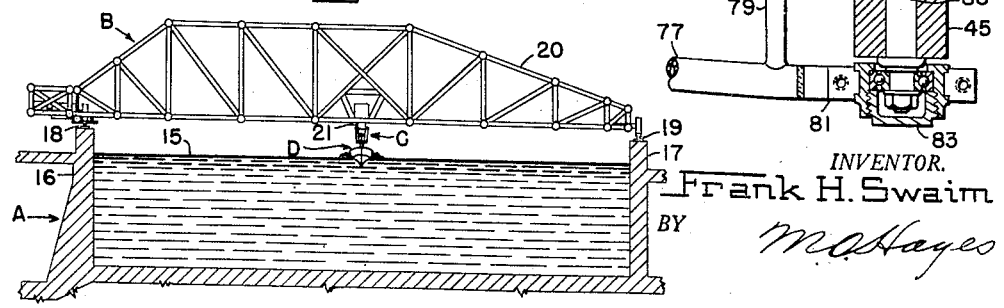

In the present example, the model D represents a high speed motor boat whose propeller shaft axis extends in the direction of the broken line 61 shown in Figures 2 and 3. Attached to the model D in alignment with the propeller shaft axis 61, as by screws 62, is an upstanding towpost bracket 63 of substantially right triangular shape and terminating at its forward end in an upstanding flange 64 extending transversely of the bracket. Mounted for vertical sliding movement on the flange, as by screws 65, is a hinge member 66 shown more particularly in Figures 9 and 10. Supported forwardly of the bracket in spaced parallel relation to the flange 64, as by a bearing plate 67 and rotary knob 68, is a screw 69 extending through the hinge member 66 and in screw threaded engagement with a portion 70 thereof. By turning the knob 68, the hinge member 66 may be raised or lowered on the guide flange 64.

Mounted for rotation about a transverse axis in spaced knuckle portions 71 of the hinge member 66 is a hinge pin 72 diametrically slotted to receive a tongue 73 constituting the after end of a tow yoke 74. Extending downwardly through the hinge pin 72 and tongue 73 is a removable pin 75 about which the after end of the tow yoke 74 may swivel. In the example shown, this tow yoke 74 comprises two spaced apart tubular bars 76, 77 rigidly connected to the tongue 73 by a transverse member 78. At its forward end portion, the yoke 74 terminates beyond a transverse bar 79 in spaced-apart lower clamp members 80, 81 in which suitable anti-friction bearing assemblies 82, 83 are mounted. Each bearing assembly is held in place as by an upper clamp member 84 and cap screws 85 as shown in Figure 4. These bearing assemblies 82, 83 are rotatable about the opposite stub end portions of a hinge pin 86 that is tightly fitted in a transverse bore 87 at the lower end of the externally threaded shaft 45. Thus the forward end of the tow yoke 74 is adapted to swivel in a vertical plane about the axis of the hinge pin 86.

It will be noted by inspection of Figure 2 that the tow yoke 74 is disposed in alignment with the propeller shaft axis 61. In order to return the tow yoke 74 to its position of alignment upon the occurrence of a change in the longitudinal attitude of the model D such as may occur during a test run, I provide means 90 for automatically controlling operation of the reversible motor 53 that adjusts the height of the towpoint lying in the axis of the forward hinge pin 86, and which control means 90 is responsive to changes in the angular relationship of the tow yoke 74 and model D. Fixed on the hinge member 66 is a vertical panel 91 provided with an opening 92 receiving the projecting end portion 93 of the hinge pin 72. This end portion 93 is reduced to provide a beveled shoulder 94 for releasably clamping a control lever 95 thereto, as by tightening a wingnut 96 on the reduced end portion. This control lever 95 may be temporarily held in a central position relative to the panel 91 by depressing a pin 97 carried by the free end of arm 95 into an opening 98 in the panel against the force of a spring 99.

Swingably mounted on the panel 91 in spaced relation at opposite sides of the control lever, as by pins 100, are arms 101, 102 urged, as by helical springs 103, 104 toward the control lever 95. These arms 101, 102 are limited in their movement toward the control lever 95 by pins 105, 106 so that the control buttons 107, 108 of normally-open "Micro" switches 109, 110, respectively carried by the arms 101, 102, will not be depressed to close the switches as long as the control lever 95 is centered relative to the panel 91. It will be noted, however, that when the control lever 95 is displaced from its neutral position, one switch control button 107 or the other 108 will be actuated depending on the direction of displacement of the control lever 95. The strength of springs 103, 104 is sufficient to hold arms 101, 102, against the stop pins 105, 106 until the control lever 95 has moved from its neutral position a relatively short distance which is sufficient to close one of the "Micro" switches 109, 110, further movement of the control lever 95 merely swinging the arm on which the closed switch is mounted.

Fixed on the towing bracket C, as by a supporting strip 111, are two normally-closed "Micro" switches 112, 113 for preventing operation of the motor 53 should the shaft 45 reach an extreme upper or lower position. One of these limit switches 112 is adapted to open upon the transmission of pressure to its control button 114 through a tappet 115 disposed in the path of upward travel of the tube 43. The other limit switch 113 is adapted to open whenever its control button 116 is depressed by downward travel of a cam 117 under the influence of a pull rod 118 longitudinally reciprocable within the square shaft 48. To the lower end of the pull rod 118 is affixed a laterally extending finger 119 disposed in the downward path of travel of an internal shoulder 120 at the upper end portion of the hollow shaft 45 so that, should the shaft 45 reach an extreme downward position, the pull rod 118 will be lowered against the force of spring 121 to open the limit switch 113.

Any suitable electrical system may be used for controlling operation of the electric motor 53 in conjunction with the normally open control switches 109, 110 and the normally-closed limit switches 112, 113. In Figure 11, for example, two relays 122—123 each having four normally-open contact members form part of an electrical system that extends between the motor 53 and a suitable source of alternating current supplied through main switch 124 from terminals 125, 126. In the arrangement shown, upon the closing of control switch 109, a circuit is established from terminal 125 through switches 109, 112 and relay winding 122a to terminal 126, thus energizing the relay 122 and causing its contact members 127—130 to close. Thereupon a circuit is established from the terminal 125 through conductor 131, contact member 128, conductor 132, motor 53, conductor 133, contact member 129, conductor 134 to the terminal 126. Simultaneously another circuit is established from the terminal 125 through conductor 131, contact member 127, conductor 135, motor 53, conductor 136, contact member 130, conductor 134 to the terminal 126. Thus the conventional main and auxiliary windings (not shown) of the reversible four-wire capacitor motor 53 are so energized through the conductors 132, 133, 135 and 136 as to produce rotation of the motor in a direction to elevate the tube 43. Should the tube 43 reach an extreme upper position wherein tappet 115 is lifted, switch 112 will be opened so as to deenergize the relay 122 and open its contact members 127—130 whereby the flow of current to the motor will be interrupted.

Should the other control switch 110 be closed, a circuit will be established from the terminal 125 through switches 110, 113 and the relay winding 123a to the terminal 126, thus energizing the relay 123 and causing its contact members 137—140 to close. Thereupon a circuit is established from the terminal 125 through conductors 131, 141, contact member 139, conductor 133, motor 53, conductor 132, contact member 138, and conductors 142, 134, to the terminal 126. Another circuit is simultaneously established from the terminal 125 through conductors 131, 141, contact member 137, conductor 135, motor 53, conductor 136, contact member 140, and conductors 142, 134 to the terminal 126. Thus the effect of operation of relay 123 is like that of relay 122 insofar as the direction of current flow through the motor winding supplied via conductors 135, 136 is concerned. However, the direction of current flow through the motor winding supplied by conductors 132, 133, is reversed, so that the motor will now rotate in a direction to lower the tube 43. Should the tube 43 reach an extreme down position, the shaft 45 will of course engage finger 119 which will lower pull rod 118 and open switch 113 so as to deenergize relay 123 and open its contact members 137—140 whereby the flow of current to the motor will be discontinued.

To facilitate adjustment of the towing bracket C before conducting a test and more particularly to permit setting of the tow yoke 74 in alignment with the propeller shaft axis 61, a pair of manually-controlled double-throw switches 141', 142 are interposed between the terminal 125 and the automatic control switches 109, 110. When switch 141' is shifted from its normal position as shown by full line to the dotted-line position a circuit shunting the normally-open automatic control switch 109 is established which effects elevation of the tube 43 and thus raises the tow point in the same manner as would be accomplished by closing of the switch 109. Shifting of the switch 141' also interrupts the supply to the other automatic control switch 110 to insure against simultaneous operation of both relays 122, 123 and resultant short circuiting of the motor supply lines. Likewise, switch 142 when shifted to its dotted line position will establish a circuit shunting the automatic control switch 110 so as to effect lowering of the towpoint. The supply to automatic control switch 109 is thereupon interrupted to prevent concurrent energization of both relays 122, 123. During this preliminary adjustment of the towing bracket C, the control lever 95 may be held in its neutral position as by use of the locking pin 97, the wing nut of course being loosened to permit free rotation of the hinge pin 72 within the hub portion of the control lever 95.

Before conducting a test, the tow yoke 74 will be aligned with the propeller shaft axis 61 by rotating screw 69 to adjust the height of the rear hinge member 66, and then by temporarily operating one of the manually-controlled reset switches 141', 142 to properly adjust the height of the towpoint, while the model D is stationary as shown in Figure 2.

At the beginning of the test run, when the towing speed of the motor boat model D increases and its bow rises, the propeller shaft axis 61 is displaced relative to the tow yoke in a counterclockwise direction as viewed in Figures 2 and 3. This relative movement of the tow yoke 74 is transmitted through the hinge pin 72 to the control lever 95 which is tightly clamped thereto by the wing-nut 96. It will of course be understood that this relative movement of the control lever results from a change in attitude of the model D while the tow yoke 74 remains stationary. Thereupon the control lever 95, in moving upwardly relative to the switch arm 101, closes switch 109 so as to effect energization of the motor 53 through the previously-described control circuit shown in Figure 11. The motor will operate in a direction to elevate the shaft 45, thus raising the hinge pin 86 at the forward end portion of the tow yoke until the tow yoke is again aligned with the propeller shaft axis. Realignment of the tow yoke will dispose the control lever 95 in its neutral position whereupon switch 109 will open, deenergizing the motor 53, which will tend to stop rotation immediately because of the locking tendency of the worm, the frictional drag exerted by the screw-threaded shaft 45 and tube 43, and the provision of a conventional automatic brake in the motor. If the tow yoke should be disposed above its position of alignment, as by slight over-running of the motor, or by reduction in the towing speed of the model during or at the end of a test run, the control lever 95 will actuate switch 110 to initiate operation of the motor in a reverse direction so as to lower the hinge pin 86 a distance sufficient to again bring the tow yoke into the desired position of alignment.

While the hereinbefore-described automatically adjustable towing bracket C is particularly well suited for use in testing models of high speed motor boats where it is desired to exert the towing force in the line of the propeller shaft, obviously the device may be used for towing other objects and for exerting a towing force in any direction relative to the towed object, as for instance, in the direction of its longitudinal axis.

Various changes may be made in the form of invention herein shown and described, without departing from the spirit of the invention or the scope of the following claims.

The invention described herein may be manufactured and used by or for the Government of the United States of America for governmental purposes without the payment of any royalties thereon or therefor.

I claim:

1. In towing equipment of the character described, a towing bracket for attachment to a towing vehicle and provided with a normally vertically disposed internally threaded sleeve, a tube having internal and external oppositely-pitched threads, the external threads of the tube engaging the internal threads of the sleeve, a hollow shaft having external threads engaging the internal threads of the tube, means slidably engaging the hollow shaft for preventing rotation of the shaft, a reversible electric motor carried by the bracket, a source of current for energizing the motor, means transmitting rotary motion from the motor to the tube, a tow yoke having forward and after end portions, a towpost for attachment to an object to be towed, means swiveling the after end portion of the yoke to the towpost for relative swinging movement in a vertical plane extending in the direction of travel of the towing vehicle, means connecting the forward end portion of the yoke to said shaft for swinging movement of the yoke in said vertical plane, and control means responsive to swiveling movement in said vertical plane of the yoke relative to the towpost for energizing said motor to maintain the yoke in a predetermined angular relation to the towpost.

2. In towing equipment of the character described, a towing bracket for attachment to a towing vehicle and having a vertically adjustable member, a towpost for attachment to an object to be towed, a tow yoke, swivel means connecting the tow yoke at one end portion to the towpost, means connecting the tow yoke at its opposite end portion to said member for vertical swinging of the tow yoke, a reversible electric motor for vertically adjusting said member, a source of current for said motor, a control arm, means releasably fastening the control arm in any one of a plurality of positions relative to said swivel means for movement of the control arm with the yoke, a pair of normally open switches mounted on said towpost, said control arm being arranged to close one of said switches upon relative swinging movement of the towpost and yoke in one direction and to close the other of said switches upon relative swinging movement of the towpost and yoke in the opposite direction, and means so connecting said switches, current source and reversible motor as to operate said motor upon relative swinging movement of the towpost and yoke in either direction from a preset angular relationship whereby said vertically adjustable member will be moved in a direction to return said towpost and yoke to said preset angular relationship.

3. In combination, a towing device for hydrodynamic testing adapted to maintain a predetermined angle between a tow yoke and tow post comprising a model, a bracket for towing said model, telescoping means mounted in said bracket, a tow post attached to said model, a tow yoke connecting said telescoping means and said tow post, motor means positioned on said bracket to activate said telescoping means, driving means connecting the motor and the telescoping means, switch means on said tow post, and means attached to the tow yoke adapted to operate said switch means to energize said motor when there is deviation from the predetermined angle between the tow yoke and tow post whereby said telescoping means is activated to compensate for said deviation.

4. In combination, a towing device for hydrodynamic testing adapted to maintain a predetermined angle between a tow yoke and tow post comprising a carriage movable relative to a body of water, a bracket mounted on said carriage and provided with a vertically adjustable member, a tow post for attachment to a model, a tow yoke swivelly connecting said adjustable member and said tow post, motor means mounted on the bracket for actuating said vertically adjustable member, driving means connecting the motor and the vertically adjustable member, switch means positioned on said tow post, and means attached to the tow yoke and adapted to operate said switch means, said latter means energizing the motor when there is any deviation in the angle between the tow yoke and tow post.

5. In combination, a towing device for hydrodynamic testing adapted to maintain a predetermined angle between a tow yoke and tow post comprising a carriage movable relative to a body of water, a bracket mounted on said carriage and provided with a vertically adjustable member, a tow post for attachment to a model, a tow yoke swivelly connecting said adjustable member and said tow post, a first means positioned on said bracket for actuating said adjustable member, a second means connecting the first mentioned means and the vertically adjustable member, a third means positioned on said tow post adapted to be closed when said tow yoke deviates from a predetermined angle with said tow post, a fourth means attached to the tow yoke and adapted to operate said third means, said third means acting to energize the first means whereby the adjustable member is actuated to correct for the angular deviation between the tow yoke and tow post.

6. In combination, a towing device for hydrodynamic testing adapted to maintain a predetermined angle between a tow yoke and tow post comprising a model, a bracket for towing said model, vertically adjustable means mounted in said bracket, a tow post attached to said model, a tow yoke swivelly connecting said adjustable means and said tow post, motor means positioned on said bracket for actuating said adjustable means, driving means connecting the motor and the vertically adjustable means, a plurality of switch means on said tow post to energize the motor in one direction or the reverse, and switch-closing means rigid with said tow yoke and positioned to activate the switch means when there is deviation from the predetermined angle whereby said motor activates the adjustable member to compensate for the deviation.

7. The combination of claim 6 wherein said vertically adjustable means consists of a plurality of telescoping shafts.

8. The combination of claim 6 wherein said vertically adjustable means consists of a plurality of threaded telescoping shafts which are adapted to extend or retract when said motor means is energized.

9. The combination of claim 6 wherein said vertically adjustable means consists of a plurality of telescoping shafts at least one of which has internal and external oppositely pitched threads.

10. In combination, a towing device for hydrodynamic testing adapted to maintain a predetermined angle between a tow yoke and tow post comprising a model, a bracket for towing said model, a vertically adjustable means mounted in said bracket, said adjustable means consisting of a plurality of telescoping shafts which are adapted to extend or retract, a tow post attached to said model, a tow yoke swivelly connecting said adjustable means and said tow post, reversible motor means positioned on said bracket for actuating said adjustable means, driving means connecting the motor and the vertically adjustable means, a plurality of switch means on said tow post to energize the motor in one direction or the reverse, switch-closing means rigid with said tow yoke and positioned to activate the switch means when there is deviation from the predetermined angle between the tow yoke and tow post whereby said motor activates the adjustable means to compensate for the deviation, and limiting means associated with said adjustable means to deenergize the motor if said adjustable member reaches a predetermined position in either direction.

11. In combination, a towing device for hydrodynamic testing adapted to maintain a predetermined angle between a tow yoke and tow post comprising a model, a bracket for towing said model, telescoping means mounted in said bracket, a tow post attached to said model, a tow yoke connecting said telescoping means and said tow post, a first means positioned on said bracket to activate said telescoping means, a second means connecting the first means and the telescoping means, switch means on the tow post, and a third means attached to the tow yoke and adapted to operate the switch means to energize said first means when there is deviation from the predetermined angle between the tow yoke and tow post, whereby the telescoping means is activated to compensate for said deviation.

FRANK H. SWAIM.

REFERENCES CITED

The following references are of record in the file of this patent:

UNITED STATES PATENTS

| Number | Name | Date |
|---|---|---|
| 633,904 | Pool | Sept. 26, 1899 |
| 1,530,849 | Muller | Mar. 24, 1925 |
| 2,315,264 | Logan | Mar. 30, 1943 |
| 2,344,535 | Clark | Mar. 21, 1944 |
| 2,378,412 | Lee | June 19, 1945 |

FOREIGN PATENTS

| Number | Country | Date |
|---|---|---|
| 15,669 | Great Britain | Oct. 3, 1891 |
| 145,862 | Great Britain | June 30, 1920 |
| 607,505 | Germany | Dec. 29, 1934 |